(No Model.) 3 Sheets—Sheet 1.
W. P. FARRELL.
POWER DRIVEN VEHICLE.
No. 513,773. Patented Jan. 30, 1894.
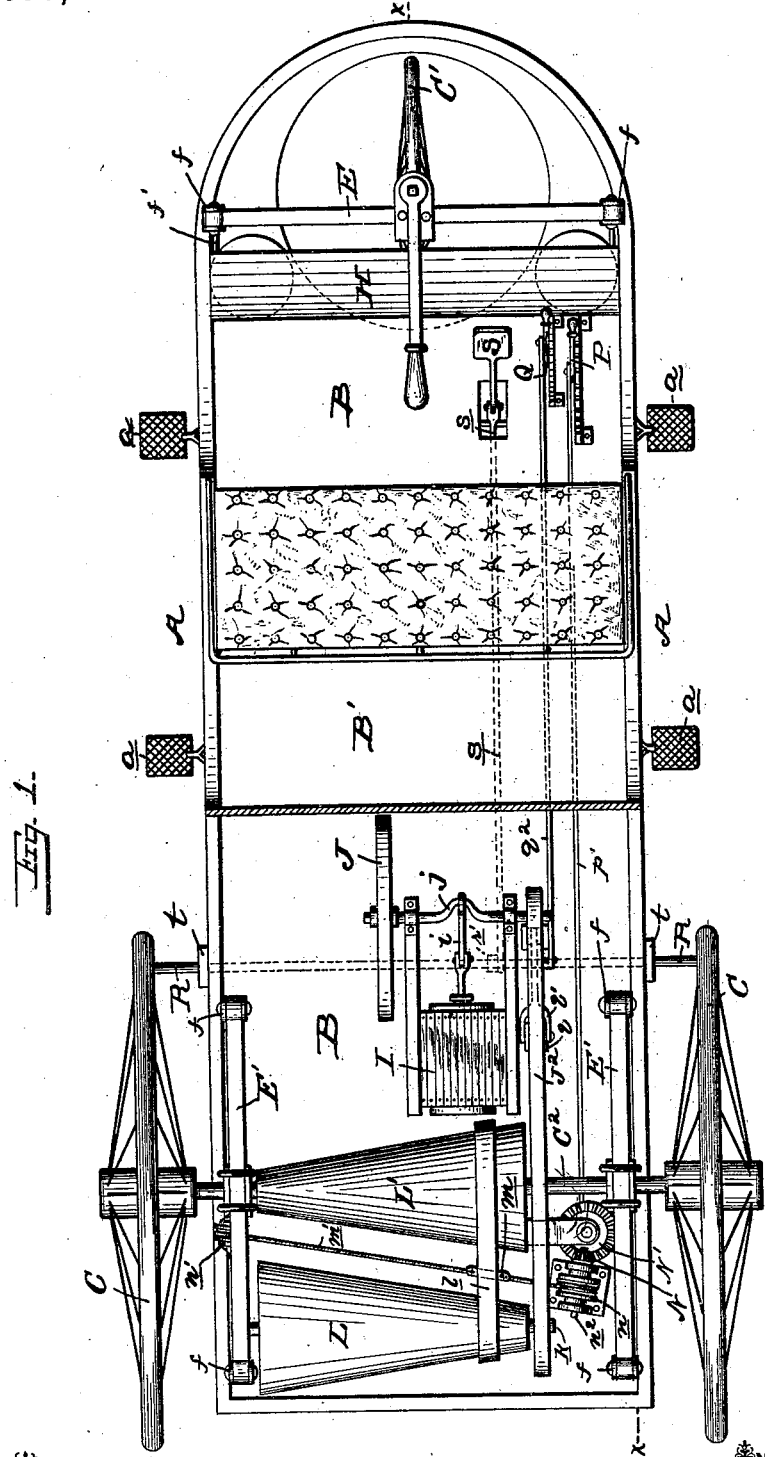
WITNESSES: INVENTOR.
William P. Farrell

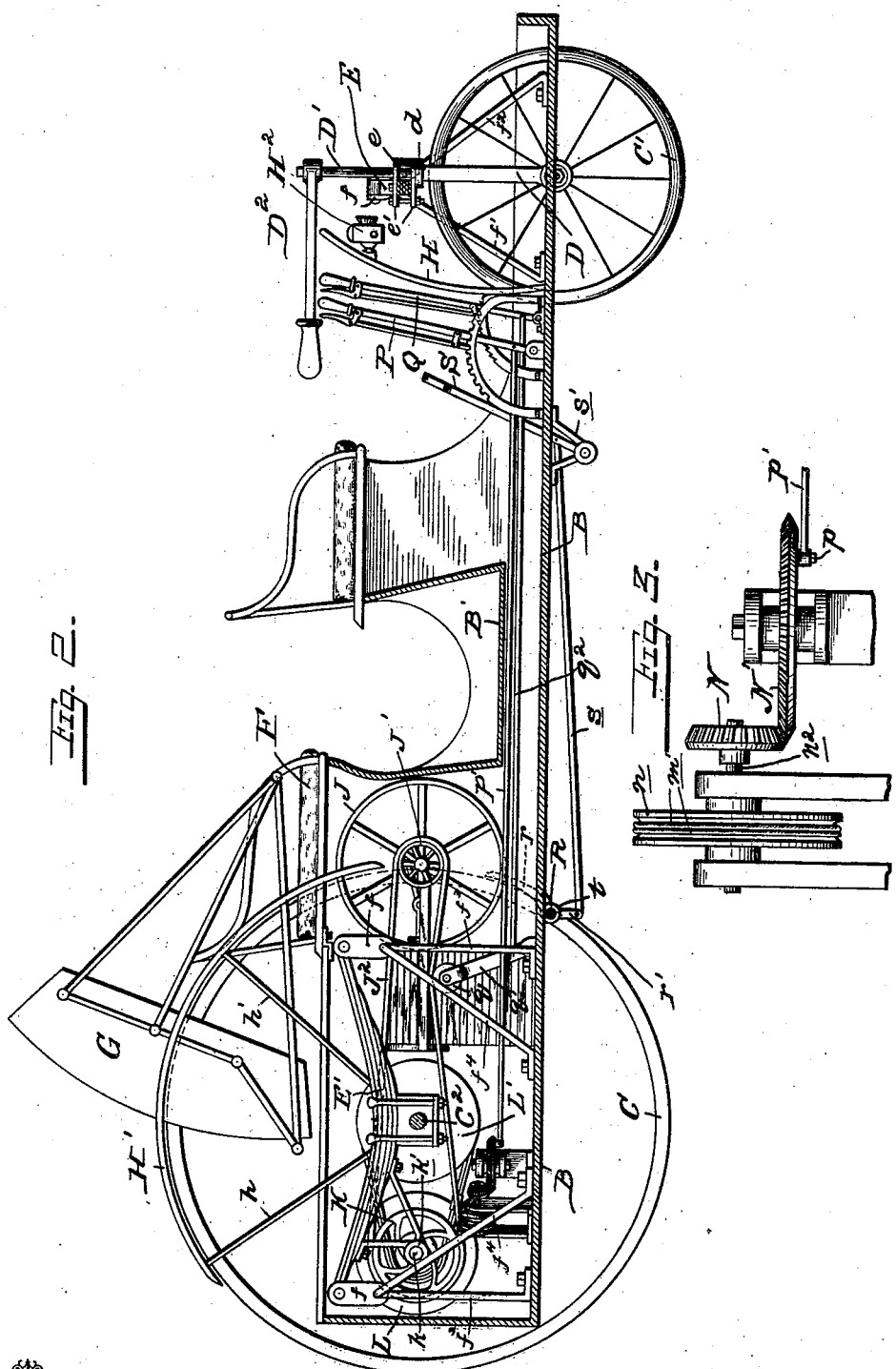

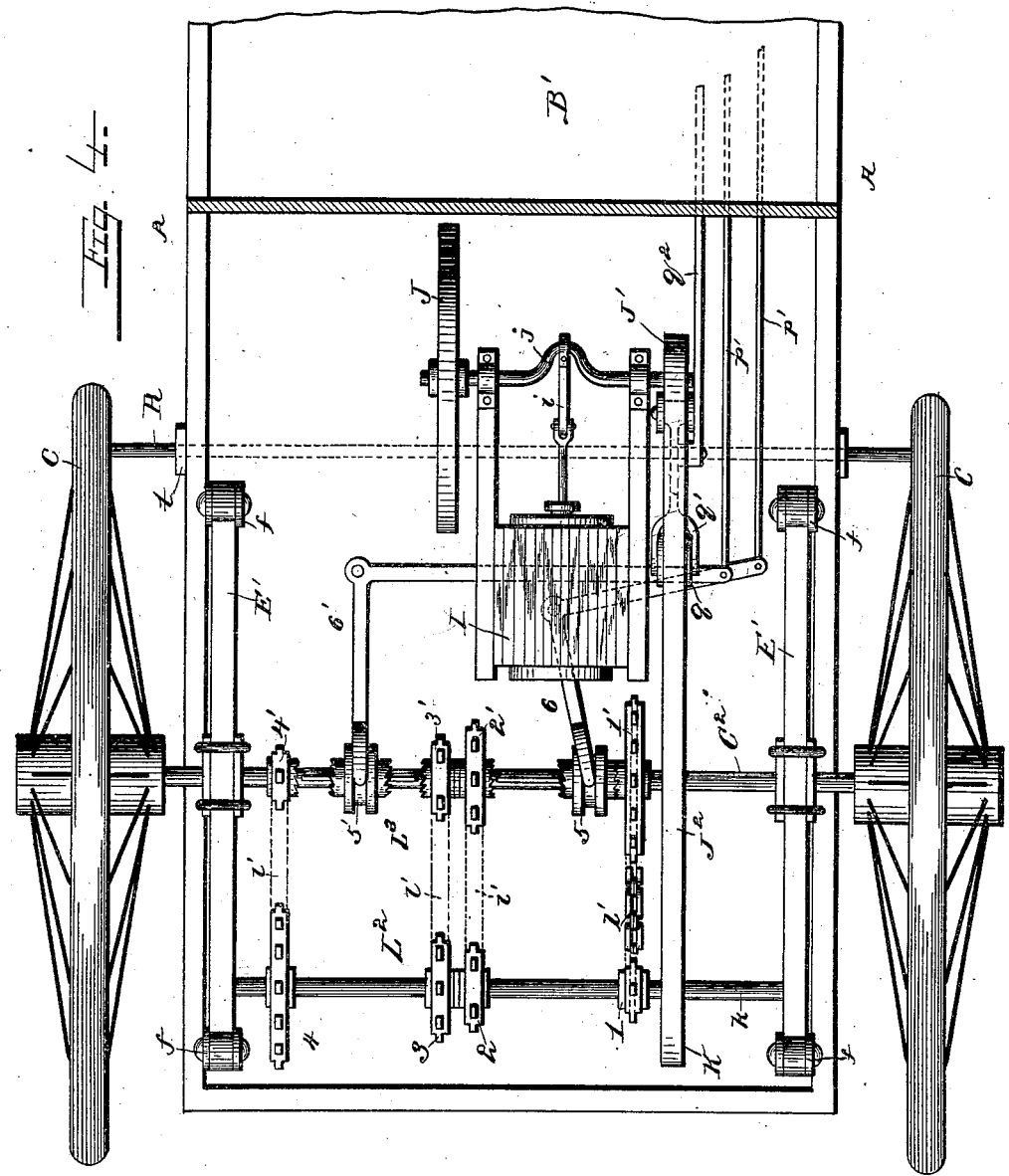

UNITED STATES PATENT OFFICE.

WILLIAM P. FARRELL, OF JAMESTOWN, NORTH DAKOTA.

POWER-DRIVEN VEHICLE.

SPECIFICATION forming part of Letters Patent No. 513,773, dated January 30, 1894.

Application filed April 21, 1893. Serial No. 471,248. (No model.)

*To all whom it may concern:*

Be it known that I, WILLIAM P. FARRELL, a citizen of the United States, and a resident of Jamestown, county of Stutsman, and State of North Dakota, have invented a new and useful Improvement in Power-Driven Vehicles, of which the following is a full, clear, and exact description, reference being had to the accompanying drawings, making part of this specification.

My invention relates to that class of vehicles designed to be propelled over ordinary roadways or streets by a motor carried by the vehicle, and it consists in a novel arrangement of the motor relative to the seat and other parts of the vehicle; in the arrangement of the springs and their connections with the body of the vehicle; in the arrangement of means for controlling the speed of the vehicle, and in certain other details of arrangement of parts, all as hereinafter described and claimed.

In the accompanying drawings—Figure 1, is a plan view of my improved road engine, with the rear seat and other parts removed, to show the parts beneath. Fig. 2, is a longitudinal section, taken on the line $x$—$x$, just inside the side frame bar of the adjacent side. Fig. 3, is a detail view of the cone-belt shifting mechanism, and Fig. 4 is a plan view showing a modification in the cone gearing.

The frame of the machine, indicated at A, may be of any suitable material, either iron or wood, and of any suitable or preferred form, that shown being rectangular in form, at its rear end and terminating, at its forward end in a half circle, extending in front of the steering wheel, the flooring, B, within said semi-circular extension being cut away to accommodate said wheel as shown.

The sides of the vehicle, in front of the rear seat are similar to those of an ordinary vehicle, with steps $a, a$, to facilitate getting in or out, and seats which are supported in any usual manner, but in rear of the entrances to the rear seat, including the upright supports for said seat, the body of the vehicle is, preferably made in rectangular box form, to inclose the motor and driving gear, and provided with a removable or hinged top or cover, facilitating access to said motor and gearing.

C, C, indicate the rear wheels, and C', the forward or steering wheel. This steering wheel is mounted in a steering fork D, the arms of which unite, above the wheel, in a collar $d$, and an upright shaft or pivot D', the upper end of which is polygonal in form to receive or has a steering lever $D^2$ keyed to it, said lever extending back to within convenient reach of the attendant in his seat. On the collar $d$, is supported a clip $e$, having rearwardly-extending parallel arms, $e', e'$, perforated to form a bearing for the steering fork pivot D', and extending in rear thereof to receive a transversely arranged leaf spring E, which is clamped firmly, centrally of its length, between said clip arms, by means of bolts, as shown. The ends of this spring have hangers or pendent links $f, f$, pivoted to them as more clearly shown in connection with the rear springs, in side elevation in Fig. 2, and the lower ends of the links $f$, are pivoted to upright and bracing rods $f', f^2$, rigidly secured at their lower ends to the body of the vehicle. By this arrangement the forward end of the vehicle is suspended from the steering fork on the spring E with the body of the vehicle about in the plane of, or it may, if preferred, be above the steering wheel axle.

The rear springs E', E', are arranged, preferably, longitudinally, and rest, centrally of their length on the axle $C^2$, to the journal boxes of which they are rigidly secured by means of suitable clips and bolts, as shown. To the ends of these springs also, pendent links $f, f$, are pivoted, the lower ends of said links being in turn pivoted to upright and bracing or angular rods $f^3$ and $f^4$, similar to those above described, and rigidly connected at their lower ends to the body of the vehicle. By this arrangement the rear end of the vehicle body is suspended from and below the axle through the springs and connections described, and the rear wheels being preferably of greater diameter than the steering wheel or wheels, the vehicle body is brought to a convenient height for getting in or out and space is thus provided between the axle and rear seat and the flooring to accommodate the motor and the driving mechanism. To give additional space, the rear seat F, is elevated more than that in front and a supplemental flooring B', is provided between the seats corresponding to the increased elevation of the seat and serving to protect the lever connections passing under said flooring from the feet of the occupants of the seat. By this elevation of the rear seat not only is the desired additional space obtained underneath, but the occupants of said seat are enabled to see over the heads of those in front of them.

The seats may be provided each with a folding top similar to that shown at G, Fig. 2, or any suitable form of top or cover may be employed, extending over all or only one of the seats, as desired.

The wheels, so far as this application is concerned, may be of any usual or preferred construction, those shown being similar to such as are in common use in velocipedes, as being best adapted to a light road engine or vehicle.

H indicates the dash-board, $H^2$, a headlight or lamp secured in front of said board, and H', a mud-guard, one of which is placed over each rear wheel, supported in position by means of rods $h$, $h'$, secured at their lower ends to the spring clips or to the springs E' adjacent to said clips.

I, indicates the motor cylinder, located underneath and in rear of the seat F, the piston rod of which is connected by a pitman $i$, with a crank-shaft $j$, mounted in suitable bearings on the frame and one end of which carries a fly-wheel J. The opposite end of this crank shaft has a band pulley J' fast on it from which a belt $J^2$, extends to a similar pulley K, on a shaft $k$, mounted in suitable angular brackets $k'$, secured to and pendent from the springs E', in rear of the axle $C^2$, as shown. The shaft $k$ carries a cone pulley L, keyed to it and from this pulley a belt $l$, extends over a similar, but oppositely facing cone pulley L', fast on the axle $C^2$. By this arrangement the mechanism for propelling the vehicle is brought into compact shape economizing the space allotted to it and all is brought within the box compartment referred to, at the rear end of the vehicle body.

The driving belt $l$, at a point midway between the cones has a loop or stirrup $m$ surrounding or engaging one member or side of it, said loop forming a link in an endless cord or band $m'$ passing around pulleys $n$ and $n'$ mounted in suitable bearings on the vehicle body. One of these pulleys $n$, forms the actuating pulley and to insure proper grasp or friction on the cord, the latter is, preferably passed twice around it, as shown in the enlarged detail view, Fig. 3. The shaft $n^2$ of this pulley has a bevel pinion N on its forward end which engages and is actuated by a bevel gear wheel N', provided with a crank pin $p$, from which a rod $p'$ extends to an upright lever P pivoted at its lower end to a floor bracket in front of the operator's seat. By operating the lever P, the driving belt, through the connections described, can be moved laterally on the cones from the smaller toward the larger end of the driving cone L, and the reverse of the driven cone L', and vice versa, for changing the speed of rotation of the axle cone and the consequent speed of the vehicle. By this arrangement any desired speed can be given to the vehicle thereby adapting it to be propelled rapidly over good and unobstructed roads, or at the slower speed required for crowded thoroughfares or rough roads. For further controlling the speed, an adjustable tension pulley $q$, is employed in connection with the driving belt $J^2$, said pulley being mounted in an arm or lever $q'$ pivoted in a floor bracket and from which arm a rod $q^2$ extends to an upright lever Q, in front of the operator, who, by operating said lever can relieve the tension on the belt sufficiently to allow the latter to slip on its actuating pulley, if necessary, and so reduce the speed of or stop the vehicle, without interfering with the motor.

The wheels, in practice, are connected with the axle by any usual or preferred form of "backing" ratchet and pawl, such as will permit one wheel to rotate faster than the axle and the other wheel, in turning corners.

R indicates a brake shaft carrying brake shoes $r$, at its ends, of suitable form to engage and act on the peripheries of the wheels C, C, said shaft being mounted in suitable bearings $t$, $t$, under the vehicle body, and provided with a crank arm $r'$ from which a rod $s$ extends to a foot lever S, passing up through a slot in the flooring, and pivoted, at its lower end in a pendent bracket $s'$.

In the modification shown in Fig. 4, the cone pulleys are made in the form of two series of sprocket wheels 1, 2, 3 and 4, on the rear, driving shaft, of increasing diameter and fast on said shaft, and 1', 2', 3' and 4', of correspondingly diminishing diameter, loose on the axle $C^2$. The opposing sprocket wheels are connected by drive chains $l'$, as indicated by dotted lines, so that when the rear shaft is in operation, all the sprocket wheels will be rotated. 5 and 5' indicate double clutches, or clutch sleeves, feathered to the axle, and having clutch faces at each end to match corresponding faces on the adjacent ends of the hubs of the two sprocket wheels between which the clutch is interposed, the arrangement being such that when the clutch 5 or 5', is moved into engagement with one of the sprocket wheels, shown, in this instance with wheel $l'$, said wheel will engage the axle and propel the vehicle, the others rotating idly on the axle driven by their respective drive chains. Each double clutch has a peripheral groove or annular double flange, as shown, with which a fork on the end of the longitudinal arm of a bell crank lever 6 or 6', engages, the transverse arm of said lever being connected by a rod $p'$, with an upright lever P, one for each double clutch, so that the operator can throw one or the other of the clutches into engagement with any one of the axle sprocket-wheels, according to the speed desired. Pulleys and belts may be used instead of the sprocket wheels and chains, if preferred.

Any suitable engine or motor may be used, that now preferred and used by me as being the cleanest, safest and most compact with which I am acquainted, being a gasoline engine, but others may be employed. The form and construction of the vehicle, also, may be varied to suit the purpose of its use, with more seats or with only one. Two steering wheels can be used instead of one, if desired, without departing from my invention.

Having now described my improvements, I claim as new and desire to secure by Letters Patent—

1. The combination in a power driven vehicle, of the cone pulleys, one of which is mounted on the main or driving axle, the belt connecting said pulleys, the endless band for shifting said belt and the gearing for operating said band connected with and operated by means of a lever in convenient reach of the operator, substantially as described.

2. The combination in a power driven vehicle of the cone pulleys, the connecting belt, one of said pulleys being connected by belt with a pulley on the engine crank-shaft, the adjustable tension pulley acting on said last named belt and the hand lever connected to said tension pulley, for controlling the tension of said belt, for the purpose and substantially as described.

3. In a road engine or power-driven vehicle, the driving axle and the springs supported thereon, in combination with the body of the vehicle suspended below said axle and the pivoted suspending links connecting said body with the springs, substantially as described.

4. The combination in a power driven vehicle of the cone pulleys, one of which is on the driving axle, a belt connecting said pulleys, a driving pulley on one of the cone shafts, a pulley on the crank shaft and a connecting belt therefrom to the cone shaft pulley, a tension device for said belt, a lever for adjusting the tension device and a lever for adjusting the driving gear for changing the speed of the vehicle, all substantially as described.

5. In a road engine or power-driven vehicle, the combination with the driving axle and the springs supported thereon, of the vehicle body suspended beneath the axle from said springs, the rear seat supported above the plane of said axle, the motor located underneath and in rear of said seat and connected to said axle and the gear inclosing case formed in part by said seat, all substantially as described.

6. In a vehicle the body of which is suspended underneath the axle, a pair of variable speed cones for propelling the same, in combination with a motor carried by said vehicle, substantially as and for the purpose set forth.

In testimony whereof I have hereunto set my hand this 17th day of April, A. D. 1893.

WILLIAM P. FARRELL.

Witnesses:
W. B. S. TRIMBLE,
THOS. S. GRIFFING.